July 11, 1967
R. W. GRACE
3,330,289
CONSTANT DELIVERY PRESELECTED FLUID FLOW VALVE CONTROL DEVICE
Filed June 8, 1964
2 Sheets-Sheet 1
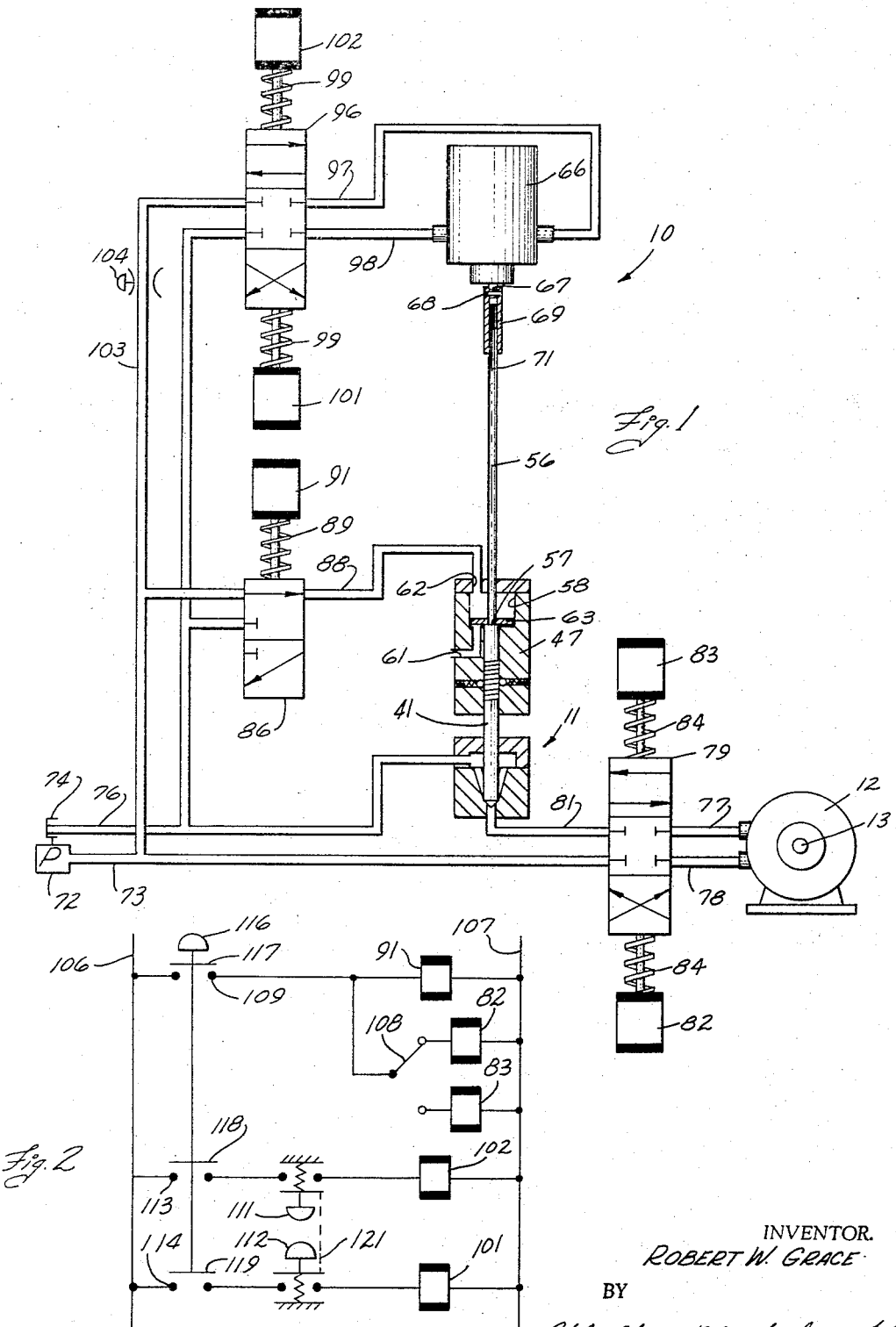
INVENTOR.
ROBERT W. GRACE
BY
Woolhams, Blanchard and Flynn
ATTORNEYS July 11, 1967   R. W. GRACE   3,330,289
CONSTANT DELIVERY PRESELECTED FLUID FLOW VALVE CONTROL DEVICE
Filed June 8, 1964   2 Sheets-Sheet 2
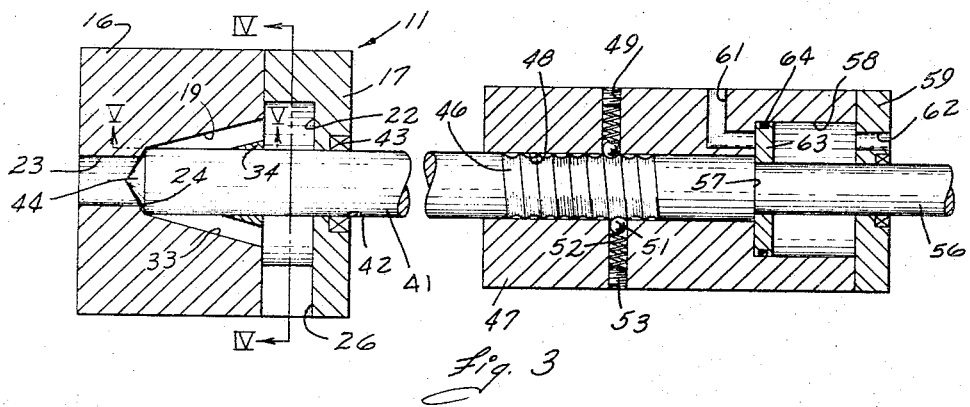
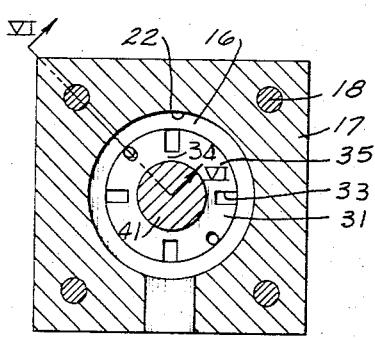
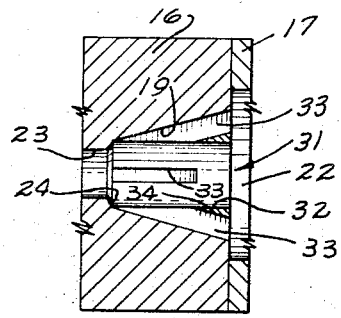
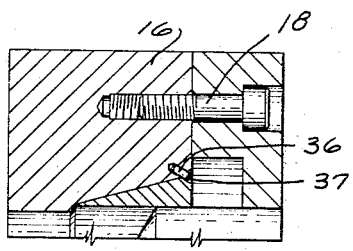
INVENTOR.
ROBERT W. GRACE
BY
Woodhams, Blanchard & Flynn
ATTORNEYS United States Patent Office 3,330,289
Patented July 11, 1967

3,330,289
CONSTANT DELIVERY PRESELECTED FLUID
FLOW VALVE CONTROL DEVICE
Robert W. Grace, Portage, Mich.
(1412 Hardwick Ave., Kalamazoo, Mich. 49002)
Filed June 8, 1964, Ser. No. 373,434
10 Claims. (Cl. 137—37)

This invention relates to a valve control and, more particularly, relates to a valving circuit capable of delivering a constant, preselected fluid flow or of supplying a fluid flow which increases or decreases at a closely controllable rate.

The valve control embodying the invention was developed for use as a hydraulic or pneumatic motor control and will, for purposes of illustration only, be described hereinafter in connection with such usage. However, it will be apparent that the valve control embodying the invention and disclosed hereinbelow is capable of controlling fluid flow independently of the load driven by said flow and may be used with a wide variety of fluid powered devices other than the motor described hereinbelow.

Although the prior art discloses many devices and control circuits for controlling and regulating the operation of pressure fluid driven loads, none of these, insofar as I am aware, has been capable of supplying pressure fluid at a flow rate which increases or decreases at a controllable rate and, hence, which can impart a controllable acceleration or deceleration rate to a motor driven thereby. Further, no such control system is known to me wherein said acceleration or deceleration is readily preselectable over a wide range of values but wherein fluid flow out of the control system is capable of being substantially instantaneously cut off if desired.

Hence, the objects of this invention include:

(1) To provide a control device for regulating pressure fluid flow through a conduit.

(2) To provide a control device, as aforesaid, for controlling the speed of operation of a pressure fluid motor and which control device operates substantially independently of the speed of the motor controlled thereby.

(3) To provide a control device, as aforesaid, actuable to increase or decrease the speed of a pressure fluid motor at a preselected time rate of change of speed and further effective to run said pressure fluid motor at any desired constant speed within the operational limits of the motor.

(4) To provide a control device, as aforesaid, in which the rate of change of pressure fluid flow thereout is substantially independent of the rate of such flow and wherein the rate of fluid flow following the initiation of fluid flow can be made directly proportional to the time elapsed from initiation of fluid flow.

(5) To provide a control device, as aforesaid, in which the rate of change of pressure fluid flow therethrough and, hence, the rate of acceleration of a motor connected thereto is a function of fluid pressure of the source connected thereto, whereby to prevent excessive flow from a small capacity pressure fluid source.

(6) To provide a control device, as aforesaid, which includes valve means between a source and a load for controlling fluid flow from said source to said load and in which fluid from said source is used to control the opening of said valve means.

(7) To provide a control device, as aforesaid, capable of shutting off pressure fluid flow therethrough instantaneously rather than at a nonzero and constant rate, if desired.

(8) To provide a control device, as aforesaid, comprised of readily available and economically manufacturable parts, which is capable of insertion between a wide variety of pressure fluid sources and any desired pressure fluid operated load, which is capable of efficient operation under a wide variety of environmental conditions, which requires little or no maintenance and is maintainable by relatively unskilled personnel for a long and substantially trouble-free service life under rugged operating conditions.

Other objects and purposes of this invention will be apparent to persons acquainted with apparatus of this general type upon reading the following specification and inspecting the accompanying drawings.

In the drawings:

FIGURE 1 is a schematic diagram disclosing a preferred embodiment of the invention.

FIGURE 2 is a schematic diagram of electrical circuitry associated with the control device of FIGURE 1.

FIGURE 3 is a central cross-sectional view of valve and valve actuating means associated with the control device of FIGURE 1.

FIGURE 4 is a sectional view taken on the line IV—IV of FIGURE 3

FIGURE 5 is a fragment of FIGURE 3 with the valve rod removed.

FIGURE 6 is an enlarged sectional view taken on the line VI—VI of FIGURE 4.

Certain terminology will be used in the following description for convenience in reference only and will not be limiting. The words "upwardly," "downwardly," "rightwardly" and "leftwardly" will designate directions in the drawings to which reference is made. The words "inwardly" and "outwardly" will refer to directions toward and away from, respectively, the geometric center of the device and designated parts thereof. Said terminology will include the words above specifically mentioned, derivatives thereof and words of similar import.

*General description*

Generally, the objects and purposes of the invention are met by providing a control device including a variable opening valve inserted in a pressure fluid line between a source and load means, such as a motor, driven by said pressure fluid. The valve contains an axially adjustable valve rod which when energized varies the opening of the valve. The valve rod is threaded for reception into resilient means whereby rotation of the valve rod effects axial movement thereof. A pressure fluid piston is affixed to the valve rod in such a way that actuation thereof in one direction will cause axial movement of said valve rod to override said resilient means. A rotary valve motor is provided for rotating said valve rod in response to pressure fluid flow from said source. Suitable valving is provided between said source and each of said valve motor, piston and driven motor to control the direction of energization thereof. Shut-off means are provided to prevent fluid flow to said valve motor and driven motor. Electrical circuitry including solenoids is preferably provided to energize said valve means.

*Detailed description*

Briefly, the control device 10 (FIGURE 1) includes a flow control valve 11 for controlling flow of pressure fluid through a load such as the driven motor 12 which is here shown for purposes of illustration as a rotary pressure fluid motor having an output shaft 13.

The flow control valve 11 (FIGURES 3–6) includes a rectangular body 16 having a cap 17 affixed thereto by convenient means such as the screws 18 (FIGURE 6). The body 16 has an outwardly divergent frusto-conical recess 19 opening out the rightward end (FIGURE 3) thereof and in communication with a preferably substantially circularly cylindrical recess 22 in the adjacent leftward wall of the cap 17. An opening 23 is coaxial with the frusto-conical recess 19 and is connected to the frusto-conical recess 19 by a seat 24. The wall of the seat 24 slopes radially outwardly and rightwardly from the opening 23 toward the frusto-conical recess 19. The seat 24 defines a solid angle greater than that of the recess 19. The leftward end of the opening 23 extends through the leftward wall of the body 16 for communication with any suitable pressure fluid line hereinafter described. An opening 26 extends radially outwardly of the recess 22 in the cap 17 for communication with any suitable pressure fluid line as hereinafter described.

A frusto-conical plug 31 (FIGURES 4 and 5) is insertable into the frusto-conical recess 19. The plug 31 has a circular central opening 32 therethrough. The diameter of the central opening 32 is substantially equal to the largest diameter of the seat 24 and extends rightwardly therefrom into communication with the recess 22. A plurality, here four, of slots 33 lie in and extend axially along the conical periphery of the plug 31. The slots 33 are preferably identical, of constant, rectangular cross section throughout their length and substantially radially aligned. The slots 33 may be formed by any convenient means, such as, for example by milling such slots 33 before the plug 31 is inserted into the body 16. Because of the slope of the slots 33 with respect to the central axis of the plug 31, the inner or leftward ends of said slots are greatly axially elongated at the intersection thereof with the central opening 32 as seen in FIGURE 5. In the particular embodiment shown, the slots 33 communicate with the central opening 32 for a distance greater than half of the length of said central opening 32.

The slope of each slot 33 places the rightward or outer end thereof at a location spaced radially outwardly from the central opening 32 to define radially inwardly thereof, a substantially wedge-shaped web 34 integral with the plug 31 and joining the segments 35 (FIGURE 4) thereof separated by the slots 33. The plug 31 is snugly disposable in the frusto-conical recess 19 so that the slots 33 are snugly enclosed on the radially outer sides thereof by the adjacent portion of the wall of the frusto-conical recess 19. Thus, the slots 33 of the installed plug 31 basically comprise circumferentially enclosed passages open at the ends thereof.

Any convenient means may be provided for maintaining the plug 31 snugly within the frusto-conical recess 19. In the particular embodiment shown in FIGURE 6, a pair of pins 36 are frictionally held in holes 37 in the body 16 which diverge leftwardly from the axis of the frusto-conical recess 19. The rightward ends of the holes 37 cut into the plug 31 whereby the pins 36 prevent both circumferential and rightward axial movement of said plug 31.

An elongated, substantially cylindrical valve rod 41 is snugly but slideably received in the central opening 32 of the plug 31 and extends rightwardly through a coaxial opening 42 in the cap 17. A suitable seal 43 in the opening 42 prevents leakage of pressure fluid from the recess 22 rightwardly along the valve rod 41. The leftward end 44 of the valve rod 41 is of a conical configuration corresponding to that of the seat 24. Thus, when the valve rod is in its leftwardmost position, as shown in FIGURE 3, the leftward end 44 of said valve rod 41 bears continuously against the seat 24 of the body 16 to block communication between the opening 23 and slots 19. Rightward movement of the valve rod 41 so that the leftward end 44 lies between the wedge portions 34 and seat 24 will partially unblocks the inner ends of the slots 33. It will be seen that the area of the inner ends of the slots 33 uncovered is directly proportional to the distance which the leftward end 44 of the valve rod 41 has been moved away from the seat 24. The valve rod 41 is sufficiently snugly fitted within the opening 32 so that little or no pressure fluid will leak therebetween when the valve is open or partially open, all of such fluid passing through the slots 33.

A portion 46 of the valve rod 41 located to the right (FIGURE 3) of the flow control valve 11 is threaded with a continuous spiral thread of preferably V-shaped cross section. A block 47 fixed by any convenient means, not shown, with respect to the valve 11 has an axially extending opening 48 coaxially aligned with the opening 42 of the flow control valve 11 for snugly but slideably receiving the threaded portion 46 of the valve rod 41 therethrough. Radial holes 49 extend from the opening 48 through the wall of the block 47 and are threaded at the outer ends thereof for reception of set screws 53 thereinto. A ball 51 and spring 52 lie in each hole 49, the spring 52 urging the ball 51 radially inwardly against the threaded region 46 of the valve rod 41. Thus, the balls 51 are urged into said threads for threadedly holding the rod 41. Thus, rotation of the valve rod 41 will, through the threads 46 and balls 51 cause axial movement of said rod 41. Axial forces exerted on the valve rod 41 in excess of the axial resistance force created by the spring loaded balls 51 will cause axial movement of said valve rod 41 by moving the threads 46 axially past the balls 51.

The valve rod 41 preferably has a portion 56 of reduced diameter to the right (FIGURE 3) of the threaded portion 46 for defining a rightwardly facing shoulder 57. The block 47 includes a radially enlarged cylindrical chamber 58 coaxial and communicating with the rightward end of the opening 48. The rightward end of the chamber 58 is covered by a plate 59. Exhaust and pressure fluid openings 61 and 62 communicate through the block 47 and plate 59, respectively, with the leftward and rightward ends of the chamber 58 for supplying pressure fluid to said chamber 58 from any convenient source hereinafter described. A piston 63 is fixed by any convenient means, not shown, against axial movement with respect to the valve rod 41. The piston 63 is disposed upon the reduced portion 56 in contact with the shoulder 57 and extends radially into snug but slideable contact with the peripheral wall of the chamber 58. It is preferred that the valve rod 41 be free to rotate with respect to the piston 63 but said piston may be rigidly affixed to valve rod 41, if desired. At least one seal ring 64 is fixed to the radially outer surface of the piston 63 for bearing on the peripheral wall of the chamber 58 to prevent excessive leakage past said piston 58. It will be apparent that pressure fluid entering the opening 62 will tend to move the piston 63 leftwardly. Such movement of said piston 63 will effect leftward movement of the valve rod 41 and, hence, of the threads 46 past the detent balls 51 to close the valve 11.

A valve motor 66 (FIGURE 1) of the rotary pressure fluid operated type has an output shaft 67. An internally splined, axially extending sleeve 69 is affixed to the shaft 67 by a pin 68. The outer, here upper, end of the reduced portion 56 of the valve rod 41 is splined as indicated at 71 for reception into the splined sleeve 69. Thus, the valve motor 66 can rotate the valve rod 41 while said valve rod 41 moves axially with respect thereto.

A source of pressurized fluid 72 connects to a suitable supply line or conduit 73. The pressure fluid supplied by the source 72 was, in a particular embodiment, hydraulic fluid but it will be noted that other fluids such as compressed air may be employed if desired. A reservoir 74 cooperates with the pressure fluid source 72 and is fed by a return line 76. It will be noted in this connection that if an environmental fluid, such as air, is used as pressure fluid, the return line 76 and reservoir 74 may be omitted from the system if desired. The supply line 73 connects to the leftward side of a combined reversing and shut-off valve 79. A pair of lines 77 and 78 connect the driven motor 12 to the rightward side of the valve 79. The return line 76 is connected through the afore-mentioned flow control valve 11 and a line 81 in series therewith to the valve 79. As an alternative arrangement, it is contemplated that the control valve 11 may be placed in the supply line 73 rather than in the return line 76 as shown. The combined valve 79 is normally closed to prevent communication of the lines 77 and 78 with the lines 73 and 81. A solenoid 82 connects to the valve 79 and when energized pulls the valve 79 into a straight open condition for connecting the supply line 73 to the line 78 and the line 77 to the return line 81. A further solenoid 83 is affixed to the valve 79 to effect a reverse connection so that the supply line 73 connects to the line 77 and the line 78 connects to the line 81. Springs 84 return the valve block 79 to its central or disconnected position when neither of the solenoids 82 and 83 is energized.

An on-off valve 86 is interposed between the supply and return lines 73 and 76 and a line 88 which connects to the opening 62 of the chamber 58. The valve 86 is urged by a spring 89 to remain in its open position shown in FIGURE 1 so that the supply line 73 is connected to line 88. A solenoid 91 is connected to the valve 86 for reversing same when energized so that the line 88 connects to the return line 76.

The supply line 73 and return line 76 also connect to the leftward side of a further combination reversing and shut-off valve 96, the rightward side of which is connected through lines 97 and 98 to the valve motor 66. Springs 99 normally position the valve 96 in its off position shown in FIGURE 1. A solenoid 101 is connected to the valve 96 and upon energization effects a straight-through connection through said valve 96 for connecting the supply line 73 to the line 97 and the line 98 to the return line 76. A further solenoid 102 is connected to the valve 96 and upon energization reverses the connection of the lines 73 and 76 to the lines 97 and 98.

The portion 103 of the supply line 73 which supplies only the valve motor 66 is preferably provided with a manually controlled flow adjusting valve 104.

Although there are a variety of electrical circuits capable of energizing the afore-mentioned solenoids, a preferred embodiment is described hereinbelow.

Referring to FIGURE 2, electrical supply lines 106 and 107 have a voltage drop applied thereacross by an convenient source, not shown, of either alternating or direct potential as required for energizing the solenoids 82, 83, 91, 101 and 102. Said solenoids each have their rightward sides thereof connected to the supply line 107. The leftward sides of the solenoids 82 and 83 are connected to alternatively selectable contacts of a manually actuable reversing switch 108. The armature of the switch 108 and the leftward side of the solenoid 91 are connected through a pair of normally open switch contacts 109 to the line 106. The leftward sides of the solenoids 101 and 102 are connected through normally open, preferably spring urged, deceleration and acceleration switches 111 and 112, respectively, and thence through normally open contacts 113 and 114, respectively, to the line 106. A manually operable system energizing switch 116 has isolated shorting members 117, 118 and 119 which when the switch 116 is moved downwardly to its closed position, independently short the afore-mentioned contacts 109, 113 and 114, respectively. Thus, the solenoids 82, 83, 91, 101 and 102 may be energized only when the switch 116 is closed. The solenoid 91 and that one of the solenoids 82 and 83 which is selected by the forward-reverse switch 108 are immediately energized on closure of the switch 116. With the system switch 116 closed, the solenoids 101 and 102 may be alternatively energized by closing the appropriate switch 111 or 112. The switches 111 and 112 are preferably mechanically interlocked as indicated at 121 to prevent simultaneous closure of both thereof.

*Operation*

Considering now the operation of the flow control valve 11 (FIGURES 1 and 3), same is opened by axial movement of the valve rod 41 away from the seat 24 (to the right in FIGURE 3). Such opening movement of the valve rod cannot be effected by the piston 63 but can be effected after disconnecting the supply line 73 from the chamber 58 and by rotation of the valve rod 41 in the proper direction by the valve motor 66, such rotation allowing the balls 51 to act through the threads 46 to move the valve rod 41 away from the seat 24. It will be noted that when the valve 11 is closed, rotation of the valve motor 66 in the opposite or closing direction will effect no axial displacement of the valve rod 41 since the seat 24 blocks same whereby the balls 51 skip across the threads 46 rather than engaging same. Closure of the valve 11 may be effected gradually through rotation of the valve rod 41 by the valve motor 66 in a direction such that the balls 51 and threads 46 effect closing movement of the valve rod 41. On the other hand, if rapid closure of the valve 11 is desired, the inlet 62 of the chamber 58 may be pressurized to move the piston 53 and thus the valve rod 41 to a closed position substantially instantaneously.

Turning now to FIGURES 1 and 2, to the operation of the circuit 10 as a whole, the supply line 73 is presumed to be pressurized by the source 72 and the adjustment valve 104 is assumed set for the desired rate of fluid flow to the valve motor 66. The direction of rotation of the driven motor 12 is selected by energization of either the solenoid 82 or the solenoid 83. Such energization is effected through the appropriate actuation of the switch 108.

Assuming the forward direction to be chosen, the switch 108 is actuated to select the solenoid 82. The solenoids 82 and 91 are energized by downward movement of the switch 116 to its closed position which places the shorting bars 117, 118 and 119 across the contacts 109, 113, and 114, respectively. Energization of the solenoid 82 moves the valve 79 to connect the supply line 73 to the line 78 and the line 77 to the line 81. Since at this point the flow control valve 11 is closed, the driven motor 12 is not energized. Energization of the solenoid 91 causes the valve 86 to be reversed to connect the opening 62 and line 88 with the return line 76. This equalizes the pressure on opposite sides of the piston 63 whereby the piston 63 will no longer interfere with axial movement of the valve rod 41 required to open the valve 11. At this point, the motor 12 is still at rest and, hence, the valve 11 is still closed.

Closure of the acceleration switch 112 energizes the solenoid 101 since the contacts 114 are closed by bar 119. Energization of the solenoid 101 opens the valve 96 so that the supply line 73 connects through the line 97 to the valve motor 66 and the line 98 connects to the return line 76. Thus, the valve motor 66 is energized to rotate in a direction for withdrawing the valve rod 41 from the valve 11 to open same. The valve motor 66 achieves a constant operating speed quickly in comparison to the time required to open the valve 11 and therefore can be considered to operate at a constant speed during the time required to open said valve so that the valve is opened at a constant rate. Thus, the valve 11 allows fluid flow from the driven motor 12 to the return line 76 at a rate which increases at a constant time rate of change. If motor speed is substantially a constant function of fluid flow rate therethrough as the following discussion assumes, the speed of the motor 12 will increase in a predeterminable fashion, more specifically, the acceleration rate of the motor 12 will be constant.

When the driven motor 12 has achieved its maximum desired rotational rate, the acceleration switch 112 is released and opens whereat the solenoid 101 is de-energized causing the valve 96 to return to its off position and thereby de-energizing the valve motor 66. Thus, the valve 11 opens no further and the driven motor runs at a constant speed. Since the switch 116 is still closed, solenoids 82 and 91 are still energized which maintains the fluid flow through the valve 79 to the driven motor 12 and maintains the valve 86 in reversed condition to keep the pressure on the piston 63 equalized. Should it be desired to further accelerate the motor 12, the acceleration switch 112 may be again closed to once again energize the solenoid 101 as described hereinabove.

Should it be desired to substantially instantaneously cut off the fluid supply to the motor 12 to stop same rapidly at any time, the system switch 116 need only be opened. The resultant de-energization of the solenoid 82 will cause the valve 79 to be moved into its intermediate or off position shown which prevents fluid flow to the motor 12. The resultant de-energization of the solenoid 91 will return the valve 86 to its straight-through position shown whereby the line 88 supplies pressure fluid to the top of the piston 63 moving same downwardly to close the valve 11. This insures that the motor 12 is shut off and returns the valve 11 to its starting condition.

As a further alternative, the motor 12 when running, for example, at a constant speed may be decelerated at a constant rate, that is, the fluid flow rate therethrough may be lowered at a constant rate. For this purpose, the deceleration switch 111 is closed which since switch 116 is still closed, energizes the solenoid 102. Energization of the solenoid 102 moves the valve 96 upwardly to reverse the connections to and, hence, direction of rotation of the valve motor 66. The balls 51 and threads 46 will under the influence of such reversed rotation cause the valve rod 41 to move at a constant rate downwardly to gradually close the valve 11. Thus, fluid flow to the motor 12 is reduced at a constant rate and the motor 12 will decelerate at a constant rate. It will be apparent that such constant rate of deceleration can also be initiated when the motor 12 is being accelerated by assuring that the acceleration switch 112 is open as, or before, the deceleration switch is closed, such assurance being a function of the connection 121.

Should it be desired to run the driven motor 12 in a reverse direction, the same procedure is followed as is outlined hereinabove except switch 108 has its armature disconnected from solenoid 82 and connected to solenoid 83. Hence, the sequence in events in the operation of the motor 12 in a reverse direction needs no further discussion.

It will be apparent that other fluid control devices than the driven motor 12 may be employed within the scope of the invention.

Although a particular preferred embodiment of the invention has been disclosed for illustrative purposes, it will be understood that variations or modifications thereof which lie within the scope of the appended claims are fully contemplated.

What is claimed is:

1. In a device for varying the rate of flow of a fluid, the combination comprising:
a source of fluid under pressure and a load to be fed thereby;
valve means variable over a range of openings to change the rate of fluid flow therethrough and means connecting said valve means to said source;
power operated actuating means energizable to vary the setting of said valve over said range at a selected constant rate;
a power source;
control means independent of said fluid source connected between said power source and said actuating means for controlling energization of said actuating means;
whereby the rate of fluid flow through said valve will change at a constant rate.

2. The device defined in claim 1 including adjustment means independent of said load and connected between said power source and said actuating means for controlling the rate at which power is supplied to said actuating means.

3. The device defined in claim 1 wherein said valve means may be adjusted between an open and a closed state, biposition means actuable to substantially instantaneously adjust said valve means to at least one of said open and closed states independently of, and overriding the influence of, said actuating means.

4. In a device for varying the flow of a fluid, the combination comprising:
a source of fluid under pressure and a load driveable by said source;
a valve having an inlet opening, an outlet opening and passage means connecting said inlet opening with said outlet opening, said valve including rod means movable in said passage for adjusting the opening of said valve between an open and closed state;
means connecting said inlet and outlet openings in series with said source and said load;
constant speed means for moving said rod means at a constant rate with respect to said passage means for varying the rate of fluid flow therethrough;
biposition means actuable to substantially instantaneously adjust said valve to at least one of said open and closed states independently of, and overriding the influence of, said constant speed means;
whereby said constant speed means controls energizing of said load in the absence of actuation of said biposition means.

5. A fluid motor control device, comprising in combination:
driven pressure fluid motor means and a source of fluid under pressure for driving same;
a flow control valve for controlling fluid flow through said driven motor means, said valve having a passage therethrough in series with said source and said motor means;
an axially elongated valve rod axially movable with respect to and through said passageway for variably blocking fluid flow therethrough, reverse axial movement of said valve rod opening said valve to an extent proportional to the movement of said valve rod, said valve rod having a threaded portion;
resilient thread engaging means for engaging the threaded portion of said valve rod for resiliently urging said valve rod in an axial direction in response to rotation of said valve rod;
rotatable valve motor means and means for securing said valve motor means to said valve rod for rotating said valve rod and for allowing axial movement of said valve rod with respect to said valve motor means, said valve motor means being energizable to operate at a substantially constant speed;
reciprocable means engageable with said valve rod to move same in at least one axial direction, said reciprocable means being capable of producing a greater axially directed force than is said resilient means;
control means for controlling the energization of said valve motor means and reciprocating means to allow operation of said driven motor at a constant speed, at a constant acceleration and deceleration and at the maximum deceleration obtainable thereby.

6. The device defined in claim 5 wherein:
said reciprocating means comprises a pressure fluid cylinder and including a valve for connecting said pressure fluid cylinder to said pressure fluid source whereby said reciprocating means can be urged in at least one of two opposite directions;
said valve motor is a pressure fluid motor and including a reversing and shut-off valve connected between said valve motor and said source for reversing and shutting off the flow of pressure fluid to said valve motor to alternatively cause rotation of said valve rod in either of two directions and stop rotation thereof as desired;
a reversing and shut-off valve connected with respect to said driven motor for alternatively reversing and cutting off the fluid flow therethrough.

7. In a device for controlling the flow of pressure fluid to a load, the combination comprising:

a source of fluid under pressure and a load to be fed thereby;

a flow control valve including a frusto-conical valve seat disposed between a cylindrical rod opening and a fluid opening of diameter reduced from that of said rod opening;

at least one further fluid passage communicating with said rod passage adjacent said seat by means of an axially elongated opening of constant circumferential width, said further passage being connected in series with said source and said load;

an elongated, cylindrical valve rod axially receivable in said rod opening and against said seat for preventing fluid flow between said fluid opening and said further passages, axial movement of said valve rod away from said seat uncovering an area of said opening proportional to the distance through which said valve rod moves to determine a rate of flow through a valve proportional to the distance of said valve rod from said seat.

8. The device defined in claim 7, including a threaded portion on said valve rod, means resiliently fixed axially with respect to said valve bearing on said threaded portion and means for rotating said valve rod whereby the action of said resilient means on said thread causes axial movement of said valve rod during rotation thereof;

a piston at least axially fixed on said valve rod;

a cylinder slideably enclosing said piston and means feeding said cylinder from said pressure fluid source;

whereby movement of said piston toward said valve will close said valve in spite of the axial positioning of said threaded portion with respect to said resilient means.

9. In a device for controlling the flow of pressure fluid to a load, the combination comprising:

a source of pressure fluid and a load to be energized thereby;

first combination valve means at least capable of reversing the flow of fluid to said load;

a rotatable pressure fluid motor, and second combination valve means between said fluid motor and said source for allowing fluid flow, reversing fluid flow and shutting off fluid flow to said motor;

a reciprocable pressure fluid cylinder and energizing valve connected between said pressure fluid cylinder and said source actuable to allow the flow of fluid to said pressure fluid cylinder;

a flow control valve in series with said load and said source, said control valve including means energizable by said motor for permitting a constant rate of fluid flow through said control valve when said motor is inoperative and for varying the rate of flow through said control valve at a constant rate when said motor is running, said flow control valve being unaffected by said pressure fluid cylinder when said pressure fluid cylinder is de-energized and said valve being closed by said pressure fluid cylinder when said pressure fluid cylinder is energized;

control means for controlling the actuation of said combination and energizing valves;

whereby fluid flow to said load may be shut off, varied at a constant rate and varied in at least one direction substantially continuously by selective actuation of said control means.

10. The device defined in claim 5 wherein said control means include:

a source of electrical potential;

a forward solenoid and reverse solenoid connected to said first combination valve for setting said first combination valve to allow forward and reverse flow, respectively, of fluid to said load;

a forward-reverse switch having an armature alternatively connectible to said forward and reverse solenoids;

a cylinder solenoid connected to said energizing valve and energizable to move said energizing valve to a position for disconnecting said pressure fluid cylinder from said source;

an acceleration solenoid and deceleration solenoid connected to said second combination valve for allowing pressure fluid flow to said pressure fluid motor in directions for opening and closing, respectively, said flow control valve;

means connecting one side of each of said solenoids to one side of said source of potential;

means connecting the other side of said cylinder energizing solenoid and said armature to a first normally open set of contacts;

means connecting other sides of said acceleration and deceleration solenoids through normally open acceleration and deceleration switches, respectively, said acceleration and deceleration switches being closable to connect acceleration and deceleration solenoids to normally open second and third sets of contacts;

means connecting said acceleration and deceleration switches for assuring that only one thereof can be closed at a time;

a system switch actuable to simultaneously close said first, second and third contacts for connecting same to the other side of said source;

whereby closure of said switch energizes said pressure fluid cylinder for allowing closure of said acceleration switch to gradually open said flow control valve, for allowing constant flow through said control valve upon opening of said acceleration switch and for gradually closing said flow control valve upon closure of said deceleration switch, opening of said system switch substantially instantaneously closing said flow control valve to de-energize said load.

References Cited
UNITED STATES PATENTS

| | | | |
|---|---|---|---|
| 470,510 | 3/1892 | Schubert | 137—630.14 |
| 1,769,838 | 7/1930 | Jackson | 137—22 X |
| 2,454,565 | 11/1948 | Peterson | 137—36 |
| 2,928,376 | 3/1960 | Levetus | 137—36 X |
| 2,959,923 | 11/1960 | Shook | 60—53 X |
| 2,968,915 | 1/1961 | Feistel | 60—53 X |
| 3,027,902 | 4/1962 | Herr | 137—37 |

CLARENCE R. GORDON, *Primary Examiner.*